(12) United States Patent
Dinger et al.

(10) Patent No.: US 10,852,062 B2
(45) Date of Patent: Dec. 1, 2020

(54) SYSTEM AND METHOD FOR DRYING AND UTILIZING SPENT GRAIN

(71) Applicants: Findlay Dinger, Orlando, FL (US); John Cheek, Orlando, FL (US)

(72) Inventors: Findlay Dinger, Orlando, FL (US); John Cheek, Orlando, FL (US)

( * ) Notice: Subject to any disclaimer, the term of this patent is extended or adjusted under 35 U.S.C. 154(b) by 125 days.

(21) Appl. No.: 16/105,584

(22) Filed: Aug. 20, 2018

(65) Prior Publication Data

US 2019/0063835 A1    Feb. 28, 2019

Related U.S. Application Data

(60) Provisional application No. 62/548,613, filed on Aug. 22, 2017.

(51) Int. Cl.

| | |
|---|---|
| F26B 7/00 | (2006.01) |
| F26B 17/20 | (2006.01) |
| F26B 21/00 | (2006.01) |
| F26B 21/08 | (2006.01) |
| F26B 21/02 | (2006.01) |
| F26B 11/16 | (2006.01) |
| F26B 25/00 | (2006.01) |
| F26B 21/04 | (2006.01) |

(Continued)

(52) U.S. Cl.
CPC ............ *F26B 17/20* (2013.01); *F26B 11/16* (2013.01); *F26B 21/003* (2013.01); *F26B 21/02* (2013.01); *F26B 21/04* (2013.01); *F26B 21/08* (2013.01); *F26B 25/007* (2013.01); *F26B 25/04* (2013.01); *A23K 10/38* (2016.05); *F26B 2200/02* (2013.01); *F26B 2200/06* (2013.01)

(58) Field of Classification Search
CPC ........ F26B 17/20; F26B 11/14; F26B 25/007; F26B 25/04; F26B 25/06; F26B 21/04; F26B 21/003; F26B 21/08; F26B 21/083; F26B 2200/02; F26B 2200/06; F26B 2200/08; A23K 10/38
USPC ......... 34/415, 413, 467, 443, 474, 218, 219, 34/222
See application file for complete search history.

(56) References Cited

U.S. PATENT DOCUMENTS 5,038,498 A * 8/1991 Woolsey ................ F26B 17/08
34/203
5,205,050 A * 4/1993 Masaaki ............... B29B 13/021
219/697

(Continued)

*Primary Examiner* — John P McCormack
(74) *Attorney, Agent, or Firm* — Jason T. Daniel, Esq.; Daniel Law Offices, P.A.

(57) ABSTRACT

A system and method for drying and utilizing spent grain includes an agitation device having an elongated semi-cylindrical mixing chamber with a motor-driven shaft and a plurality of agitators. A lid is hingedly positioned along the top end of the chamber and is connected to the dehumidification system by a pair of air ducts. An air filtration device is interposed between the air output of the agitation device and the air input of the dehumidification system. A method of drying spent grain includes the steps of pouring spent grain into the interior space of the chamber, securing the lid in the closed position, agitating the grain inside the chamber via the agitators, removing damp air from the interior space of the chamber, and introducing dry warm air to the interior space of the chamber until a moisture content of the spent grain achieves a user specified level.

6 Claims, 2 Drawing Sheets

(51) Int. Cl.
*F26B 25/04* (2006.01)
*A23K 10/38* (2016.01)

(56) References Cited

U.S. PATENT DOCUMENTS

| | | | | |
|---|---|---|---|---|
| 6,307,193 B1* | 10/2001 | Toole | ............... | A47J 36/06 |
| | | | | 126/386.1 |
| 2002/0029791 A1* | 3/2002 | Matsuoka | ............ | C23C 16/4407 |
| | | | | 134/18 |
| 2012/0066924 A1* | 3/2012 | Ando | ............... | A23B 9/04 |
| | | | | 34/90 |
| 2015/0252515 A1* | 9/2015 | Henry | ............... | F26B 25/22 |
| | | | | 34/443 |

\* cited by examiner

SYSTEM AND METHOD FOR DRYING AND UTILIZING SPENT GRAIN

CROSS-REFERENCE TO RELATED APPLICATIONS

This application claims the benefit of U.S. application Ser. No. 62/548,613 filed on Aug. 22, 2017, the contents of which are incorporated herein by reference.

TECHNICAL FIELD

The present invention relates generally to the production of foodstuffs, and more particularly to a system for drying spent grain, and method for creating a usable powder product from the dried spent grain.

BACKGROUND

The statements in this section merely provide background information related to the present disclosure and may not constitute prior art.

Several grains such as barley, wheat, rye, maize, rice, sorghum and millet, for example, are used in the production of beer and other malted beverages. Throughout the brewing process a wide variety of equipment and methodologies are employed to extract sugars from the grain prior to the introduction of yeast which aids in turning the extracted sugars into alcohol through a fermentation process.

Once all of the sugars have been removed, the spent grain (referred to hereinafter as brewers' grain) are leftover as a by-product that must be disposed. Although brewers' grains are high in fiber and protein, the gritty composition and high moisture content of approximately 78-86% has, thus far found little to no useful market for human consumption. As a result, brewers' grain is typically sold to the farms and other such industries for use as ultra-low-cost animal feed.

Accordingly, it would be beneficial to provide a system for drying spent grain and a method of converting the dried spent grain into a consumable product that can be utilized for any number of different purposes.

SUMMARY OF THE INVENTION

The present invention is directed to a system and method for drying and utilizing spent grain. One embodiment of the present invention can include a spent grain drying system that includes an agitation device, an air filtration device, and a dehumidification system. The agitation device including an elongated semi-cylindrical mixing chamber having a motor-driven shaft and a plurality of agitators. The agitation device can include a lid for creating an airtight space within the mixing chamber. The dehumidification system can be connected to the agitation device via a pair of ducts and can function to remove moist air and introduce warm dry air during agitation of the grains.

In one embodiment, the system can also include an air filtration device that is interposed between the air output of the agitation device and the air input of the dehumidification system. The air filtration system can function to remove airborne particulates and dust from the closed air system.

One embodiment of the present invention can include a method of drying spent grain utilizing the spent grain drying system. The method can include the steps of pouring spent grain into the interior space of the chamber, securing the lid in the closed position, agitating the grain inside the chamber via the agitators, removing damp air from the interior space of the chamber, and introducing dry warm air to the interior space of the chamber until a moisture content of the spent grain achieves a user specified level.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
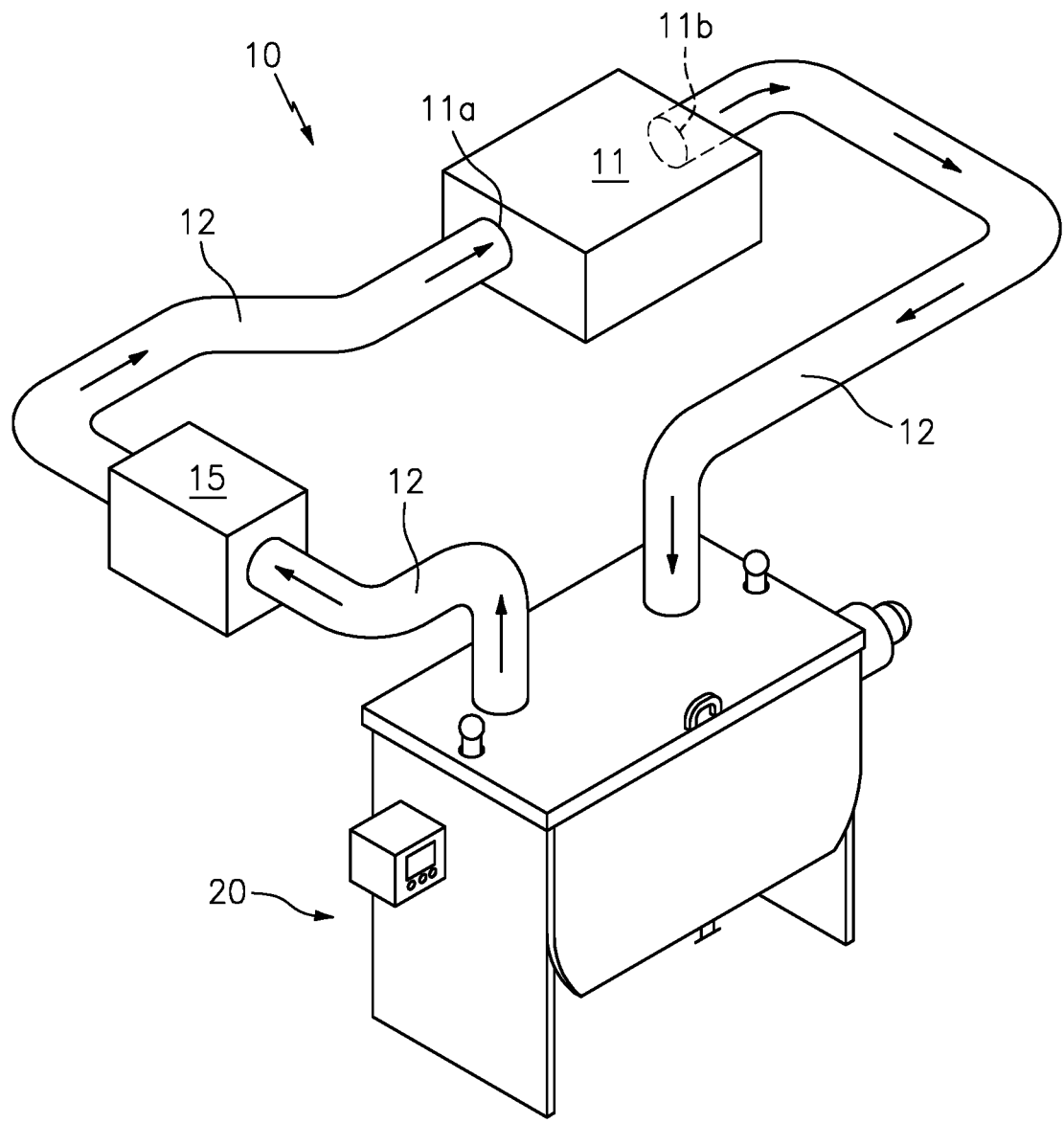
FIG. 1 is a perspective view of a spent grain drying system that is useful for understanding the inventive concepts disclosed herein.
Figure 2:
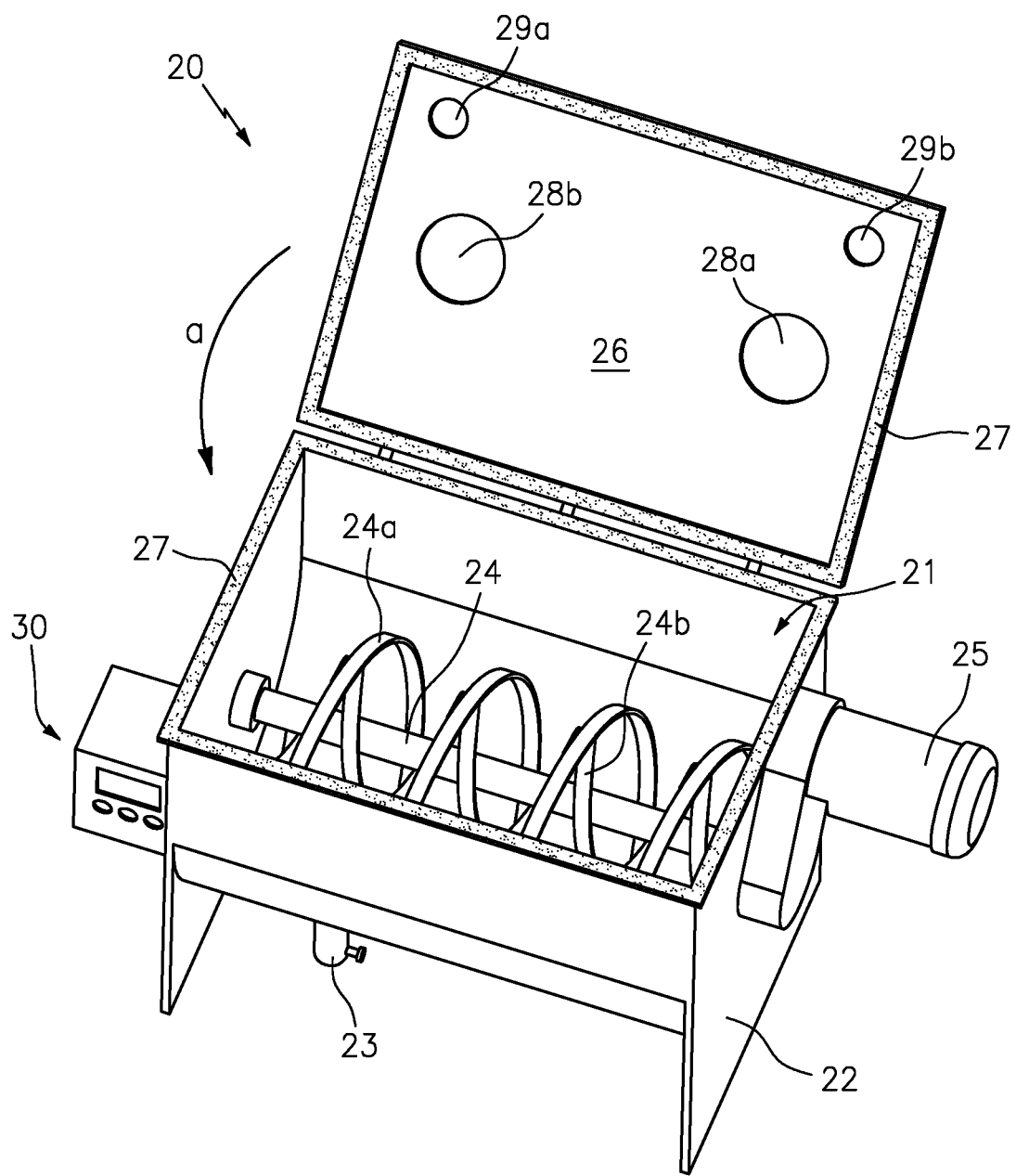
FIG. 2 is a perspective view of the agitation system of the spent grain drying system, in accordance with one embodiment of the invention.

FIGS. 1 and 2 illustrate one embodiment of a system and method for drying and utilizing spent grain that is useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one embodiment of a system for drying spent grain 10, that includes a dehumidification system 11, an air filtration device 15 and an agitation device 20.

The dehumidification system 11 can function in the expected manner whereby damp humid air is received through a ducted input 11a, and warm dry air is expelled through a ducted output 11b. The dehumidification system can be connected between the below described air filtration device 15 and agitation device 20 by air ducts 12 that are in communication with the ducted input 11a and ducted output 11b, respectively.

In one embodiment, the dehumidification system can include a 320 CFM low grain refrigerant dehumidifier such as the model 1830 dehumidifier that is commercially available from Aprilaire®. Of course, any number of other commercially available dehumidification systems are also contemplated.

The air filtration device 15 can function to remove dust and other particulates from the air circulated by the ducts 12. The filtration device can be connected between the dehumidification system 11 and the agitation system 20 and can include a ducted filter box for housing an internally located HEPA filter, for example. Of course, the filtration device is not limited to the use of a HEPA filter, as any number of other components capable of capturing and trapping airborne particles such as dust, for example are also contemplated.

The agitation device 20 can function to receive material such as spent grain, for example, and continuously agitate the same. As shown best in FIG. 2, one embodiment of the agitation device 20 can include an elongated semi-cylindrical mixing chamber 21 that is positioned horizontally along a device frame 22. A discharge valve 23 is positioned along the bottom end of the chamber for discharging the grain after the agitation process.

An elongated shaft 24 can extend along the length of the chamber and can include a plurality of agitators that radiate outward from the shaft. In the preferred embodiment, the agitators can comprise a set of outer and inner helical-shaped agitators 24a and 24b that are positioned within the chamber, however other shapes are also contemplated.

A motor 25 can be connected to the shaft in order to impart a rotational force thereto. The motor can be connected to a device controller 30 so as to allow a user to selectively activate the motor to turn the agitators. In various embodiments, the controller can also be in communication with the dehumidification system so as to allow a user to control a complete operation of the system from a single console; however, other embodiments are contemplated wherein each system component is controlled independently via separate controllers.

A lid 26 can be hingedly secured along the top end of the chamber 21. As shown by arrow a, the lid can transition between a closed position (FIG. 1) while the device is in operation, and an open position (FIG. 2) when the device is being loaded or unloaded. The lid and/or upper periphery of the chamber 21 can include an elastomeric gasket 27 or other such device that functions to create an airtight space within the chamber when the lid is in the closed and locked position.

A pair of apertures 28a and 28b can be positioned along opposite ends of the lid 26. The apertures can function to engage the air ducts 12 that are connected to the dehumidification system 11 and the air filtration device 15, respectively. Likewise, a pair of ventilation ports 29a and 29b can be positioned along the lid 26 and can function to allow a user to equalize pressure within the closed system and as a way to access the grain within the chamber without having to open the lid 26.

In operation, spent grain that has been previously separated from its bulk water content can be poured into the chamber 21 of the agitation device 20. Next, a user can secure the lid 26 in the closed position and activate the motor 25 and dehumidification system 11. Operation of the motor functions to rotate the shaft 24 whereby the outer helical agitators 24a move the grain in a first direction, and the inner helical agitators 24b move the grain in the opposite direction.

During the agitation process, the dehumidification system 11 can function to continuously remove moisture from the grain and introduce dry warm air until the moisture content of the grain is lowered to a user-specified amount. Simultaneously, the air filtration system can function to remove any particulates from the air circulating through the system. Although not specifically illustrated, any number of air diffusers or other such devices can be positioned along the air circulation path to reduce the amounts of airborne particulates.

Accordingly, the system 10 can function to reduce the moisture content of spent grain through prolonged exposure to agitation and constant dehumidification. As the system is designed to process spent grain that has previously been cooked, it is important that no heating elements are introduced in the drying procedure, as the addition of heat would continue the cooking process, thus damaging the grain and making the same unusable for the below described processing method.

Although described above for use with spent grain, other embodiments are contemplated wherein the system 10 can be utilized to reduce the moisture content of other types of materials. Accordingly, use of the device is not to be construed as limiting.

Moreover, although the system components 11, 15 and 20 have been described as including separate individual elements, the inventive concepts disclosed herein are not so limiting. To this end, one of skill in the art will recognize that one or more individually identified components may be formed together as one or more continuous components, either through manufacturing processes, such as welding, casting, or molding, or through the use of a singular piece of material milled or machined with the aforementioned components forming identifiable sections thereof.

One embodiment of a method for converting spent grain into a high protein consumable powder product utilizing the system 10 is described below. Other features of the current embodiments will become apparent in the course of the following descriptions, which are given for illustration of the current embodiments, and are not intended to be limiting thereof.

Step 1. Acquiring/Producing Spent Grain.

In the preferred embodiment, spent grain for use herein will be in the form of wet brewers' grains that have been produced as a by-product of the beer making process. Wet brewers' grains are suspended in bulk fluid and are typically shipped in multi-gallon barrels.

Step 2. Removing the Bulk Fluid.

In the preferred embodiment, the brewers' grains can be poured into a vessel having a strainer along the bottom end through which the bulk water can pass. Next, a pressure can be applied to the grains against the strainer in order to remove additional bulk/standing water from the mixture. At the conclusion of this step, the spent grains will be moist to the touch, and will include an inner moisture composition of between 70% and 80%.

Step 3. Reducing the Moisture Content of the Grains.

In the preferred embodiment, the above described system for drying spent grain 10 can be utilized in this step. To this end, the grains from step 2 can be placed directly into the chamber 21 of the agitation device, and the motor 25 and dehumidification system 11 can be activated. When used with the 50-gallon agitation chamber and dehumidification system described above, this process will continue for approximately 8 hours at which time the moisture level of the agitated grains will be at approximately 8%.

Step 4. Mill the Dried Grains.

In the preferred embodiment a stone mill, or other such device can be used to grind/crush the dried grains from step 3. During this process, the husks can be separated from the grain, and can be captured by a screen. The screen including a size that will capture the husks, while allowing the crushed grain powder to pass through. At the conclusion of this step, two distinct and commercially viable products are created.

Step 5. Packaging.

Both the husks and the grain powder can be separately bagged and shipped to various markets in any number of different quantities utilizing known packaging processes.

The final packaged husk product can be used as an organic filler in the beer making process as a substitute for more expensive rice hulls. Of course, many other uses are contemplated.

The final packaged grain powder is extremely high in protein, fiber and calcium, while having very low carbohydrates. As a result, the powder can have many consumer applications ranging from high protein supplements for milkshakes, to a healthy flower substitute that can be used for cooking. Of course, many other uses are also contemplated.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for drying spent grain, comprising:
   an agitation device body having an elongated semi-cylindrical mixing chamber;
   a discharge valve that is positioned along a bottom end of the mixing chamber;
   an elongated shaft that is positioned along a length of the mixing chamber, said shaft having a plurality of agitators extending radially outward;
   a motor that is connected to one end of the shaft;
   a lid that is in communication with a top end of the mixing chamber, said lid being configured to transition between an open position and a closed position;
   a dehumidification system that is in communication with an interior space of the mixing chamber via a plurality of air ducts;
   an air input channel that is disposed along one end of the lid;
   an air output channel that is disposed along another end of the lid, wherein an output of the dehumidification system is in communication with the air input channel by one of the plurality of air ducts, and an input of the dehumidification system is connected to the air output channel by another of the plurality of air ducts; and
   an air filtration device that is interposed between the output channel of the lid and the input of the dehumidification system.

2. The system of claim 1, further comprising:
   an elastomeric seal that is interposed between the lid and the top end of the mixing chamber, said seal functioning to create an airtight space within the mixing chamber when the lid is in the closed position.

3. The system of claim 1, wherein the dehumidification system includes functionality for selectively removing moist air from the interior space of the mixing chamber via the output channel, and depositing warm dry air into the interior space of the mixing chamber via the input channel.

4. The system of claim 1, further comprising:
   a controller that is configured to selectively operate the motor based on a user input.

5. The system of claim 1, further comprising: at least one ventilation port that is positioned along the lid.

6. A method of drying spent grain, comprising:
   providing a system that includes an agitation device body having an elongated semi-cylindrical mixing chamber, a discharge valve that is positioned along a bottom end of the mixing chamber, an elongated shaft that is positioned along a length of the mixing chamber, said shaft having a plurality of agitators extending radially outward, a motor that is connected to one end of the shaft, a lid that is in communication with a top end of the mixing chamber, said lid being configured to transition between an open position and a closed position, a dehumidification system that is in communication with an interior space of the mixing chamber via a plurality of air ducts, and an air filtration device that is interposed between an output channel of the lid and an input of the dehumidification system;
   pouring spent grain into the interior space of the chamber;
   securing the lid in the closed position;
   agitating the grain inside the chamber via the agitators;
   removing damp air from the interior space of the chamber; and
   introducing dry, warm and filtered air to the interior space of the chamber.

\* \* \* \* \*